United States Patent [19]

Ahn

[11] Patent Number: 5,590,584
[45] Date of Patent: Jan. 7, 1997

[54] BARBECUE

[75] Inventor: Boo H. Ahn, Seoul, Rep. of Korea

[73] Assignee: Shin Young Co., Ltd., Seoul, Rep. of Korea

[21] Appl. No.: 564,089

[22] PCT Filed: Apr. 8, 1995

[86] PCT No.: PCT/KR95/00036

§ 371 Date: Dec. 8, 1995

§ 102(e) Date: Dec. 8, 1995

[87] PCT Pub. No.: WO95/27427

PCT Pub. Date: Oct. 19, 1995

[30] Foreign Application Priority Data

Apr. 11, 1994 [KR] Rep. of Korea .................... 1994/7536
Apr. 14, 1994 [KR] Rep. of Korea .................... 1994/7722

[51] Int. Cl.[6] .................... A47J 37/00; A47J 37/04; A47J 37/06; A23L 1/00
[52] U.S. Cl. .................... 99/327; 99/331; 99/341; 99/377; 99/389; 99/391; 99/395; 99/421 H; 99/421 V; 99/447; 99/450; 99/451; 99/427; 219/521; 219/678; 219/719
[58] Field of Search .................... 99/325–333, 372–380, 99/385–395, 419–421 V, 444–450, 451, 427, DIG. 14; 219/492, 521, 678, 685, 700, 703, 759, 719; 126/25 R, 9 R

[56] References Cited

U.S. PATENT DOCUMENTS

| | | | |
|---|---|---|---|
| 2,581,570 | 1/1952 | Amanatides | 99/421 V |
| 2,687,080 | 8/1954 | Dorin | 99/421 V |
| 3,867,877 | 2/1975 | Zajc | 99/393 X |
| 3,959,620 | 5/1976 | Stephen, Jr. | 99/447 X |
| 4,072,092 | 2/1978 | Kohli et al. | 99/389 |
| 4,165,731 | 8/1979 | Lehtovaara | 99/385 X |
| 4,469,019 | 9/1984 | Baer | 99/393 X |
| 4,481,408 | 11/1984 | Scheufler | 219/386 X |
| 4,492,152 | 1/1985 | DeSantis | 99/397 |
| 4,562,771 | 1/1986 | Williams | 99/397 |
| 4,805,587 | 2/1989 | Schweitzer | 99/340 |
| 5,117,748 | 6/1992 | Costa | 99/427 |
| 5,431,093 | 7/1995 | Dodgen | 99/427 |

Primary Examiner—Timothy F. Simone
Attorney, Agent, or Firm—Fliesler, Dubb, Meyer & Lovejoy

[57] ABSTRACT

A barbecue appliance capable of cooking a variety of foods by disposing a rotary grill in which food is held vertically within a cooking chamber between heating members provided therein and rotating the rotary grill between the heating members, so that an optimum cooking state is obtained. The barbecue includes a cooking unit and a rotary grill which may be inserted into the cooking unit. The cooking unit has an outer casing provided with an elongated top opening and having a removable drip reservoir provided in the bottom thereof, a main frame encased by the outer casing and having a bottom wall and side walls defining therewithin a vertical cooking chamber opened and its top, heating members disposed on both sides of the cooking chamber, a drive section having a driving gear extended to the inside of the cooking chamber, a solenoid-releasable lifting and lowering mechanism for lifting and lowering the rotary grill in the cooking chamber. The rotary grill includes a pair of hinged outer frames having a grip fixed thereto, a fixing rim rotatably carried within each outer frame and having a gear for meshing with a driving gear of the drive section, and a wire mesh grillwork fixed to each of the fixing rims for holding food thereon. Food placed between the grillworks is held stably when the hinged outer frames are folded and locked together at the grip. The rotary grill may be inserted vertically into the cooking unit and lowered into the cooking chamber.

35 Claims, 9 Drawing Sheets

BARBECUE

TECHNICAL FIELD

The present invention relates to a barbecue, and particularly to an improved barbecue capable of advantageously cooking a variety of foods by providing a rotary grill vertically disposed between heating members, whereby an optimum cooking state of various kinds of foods may conveniently be obtained.

BACKGROUND ART

As used herein, the term 'barbecue' (also called a "brazier", "broiler", or "rotisserie") refers to a cooking appliance by which food is cooked by direct exposure to a source of radiant heat (typically 'red' heat), as by being placed on a grated metal frame or grill or on a rotating spit disposed before a heat source.

Accordingly, so as to barbecue, grill, roast, toast or broil various kinds of foods, the consumer must purchase different cooking appliances each intended especially for cooking a desired kind of food, which is both inconvenient and costly.

In addition, in case of barbecueing a kind or cut of meat having a great thickness, the meat must typically be turned during the cooking so as to expose both sides of the meat to the single heating source employed to thereby evenly cook the meat. Furthermore, a rotating spit such as a rotisserie has long been known to be employed in barbecueing bulky pieces of meat, for turning the meat before the heating source so as to evenly cook the meat, but its use is limited and often inconvenient. More recently, a cooking system employing a turntable has been introduced, which is capable of evenly cooking a bulky piece of meat; however, in this case, the fat contained in the meat being cooked can not be effectively eliminated because the meat is placed on a tray supported by the turntable.

Still further, the known cooking devices are relatively heavy and bulky and therefore are not easily portable. Also, basting and saucing foods while cooking them is sometimes difficult. In addition, in the course of grilling a piece of meat, sizzling fat and grease from the meat being grilled may splash all over the insides of the cooking appliance, causing the insides thereof to become dirty and also smoke to be generated.

DISCLOSURE OF THE INVENTION

Accordingly, it is an object of the present invention to provide a barbecue which overcomes the problems encountered in the conventional barbecue appliances.

It is another object of the present invention to provide an improved barbecue capable of advantageously cooking a variety of foods by providing a rotary grill disposed vertically between heating members, so that an optimum cooking state is obtained.

It is still another object of the present invention to provide an improved barbecue including a reservoir disposed at the bottom of the cooking chamber for receiving debris, grease and drippings from foods being cooked, thereby preventing a smoke occurrence due to the burning of grease.

It is still another object of the present invention to provide an improved barbecue capable of advantageously eliminating grease and oils when cooking foods such as fish, meat or the like.

It is still another object of the present invention to provide a portable barbecue permitting convenient basting and saucing of the food during cooking.

It is still another object of the present invention to provide an improved barbecue including a cooking unit and a disassemblable rotary grill insertable thereinto, whereby it is made easy to clean.

To achieve the above objects, there is provided an improved barbecue which includes a cooking unit having a vertical cooking chamber, heating means disposed facing each other on both sides of the cooking chamber, a rotary grill for receiving food and insertable within the cooking chamber so as to be vertically disposed therein between the heating means, arid means for driving the, rotary grill to rotate within the heating chamber.

In a preferred embodiment, the cooking unit of the barbecue according to the present invention includes an upper casing detachably coupled to a lower casing, a main frame encased within the upper and lower casings and defining therewithin a vertical cooking chamber, heating members mounted within the main frame and disposed on each side of the cooking chamber, a drive section provided on the main frame and driven by a drive motor, a timer electrically connected to the heating members and the drive motor for setting operational times thereof, a solenoid electrically connected with and operated by the timer, and a lifting and lowering mechanism cooperable with the solenoid and movable vertically within the cooking chamber for lifting and lowering the rotary grill therewithin.

In addition, the rotary grill of the barbecue according to the present invention includes a pair of outer frames foldingly coupled with each other by a hinge and having a grip handle, a pair of fixing rims rotatably coupled to the outer frames and rotatable by a drive force transferred from the drive section, and wire mesh grillworks detachably fixed to each of the fixing rims for holding food to be cooked therebetween.

The barbecue according to the present invention is directed to barbecue foods held by the wire mesh grillworks of the rotary grill while being rotated between the heating members within the cooking chamber by means of the driving force from the drive section.

MODES FOR CARRYING OUT THE INVENTION

Figure 1:
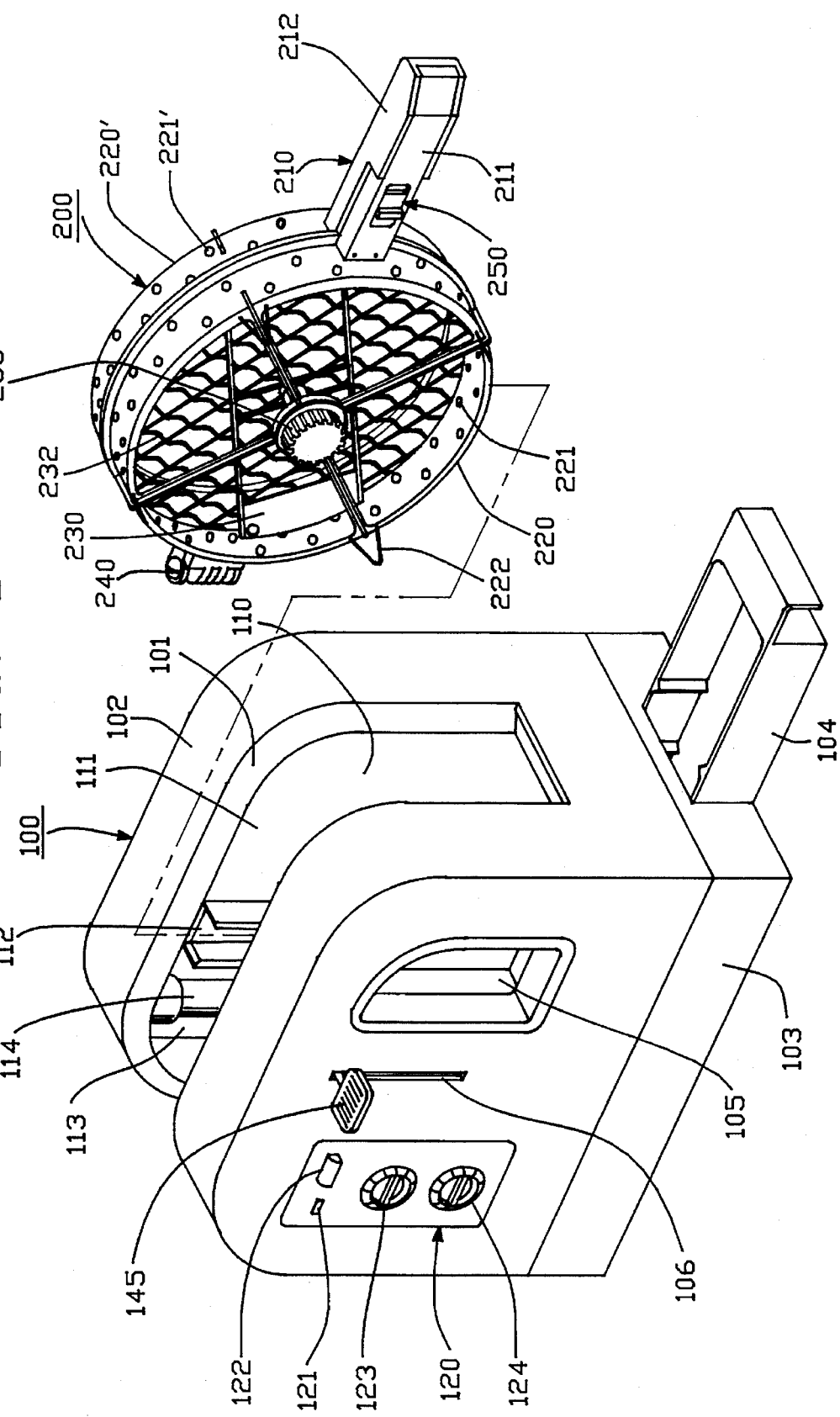
FIG. 1 is a perspective view of a barbecue according to the present invention, illustrating the rotary grill removed from the cooking unit.

Referring to FIG. 1, there is shown a first embodiment of the barbecue according to the present invention. As shown therein, the barbecue includes a cooking unit 100 and a rotary grill 200 insertable within the cooking unit 100.

The cooking unit 100 is provided with an upper casing 102 having an upwardly opened central opening 101. A lower casing 103 supports the upper casing 102 and is centrally provided with a drawer type reservoir or drip pan 104 slidable within the bottom of the lower casing 103. The upper casing 102 and the lower casing 103 encase therewithin a main frame 110 having a bottom wall and side walls defining an upwardly and downwardly opened vertical cooking chamber 111 therewithin. The bottom of the cooking chamber 111 is opened to the reservoir 104.

An operation control panel 120 having a plurality of elements related to the operation of the barbecue such as switches and timers is provided on the upper casing 102. A viewing window 105 is also provided in the upper casing 102 for viewing the inside of the cooking chamber 111 while cooking. A vertically elongated guide slit 106 for guiding a control knob 145 of a lifting and lowering mechanism to be described later is provided in the upper casing 102 between the operation control panel 120 and the viewing window 105.

Figure 2:
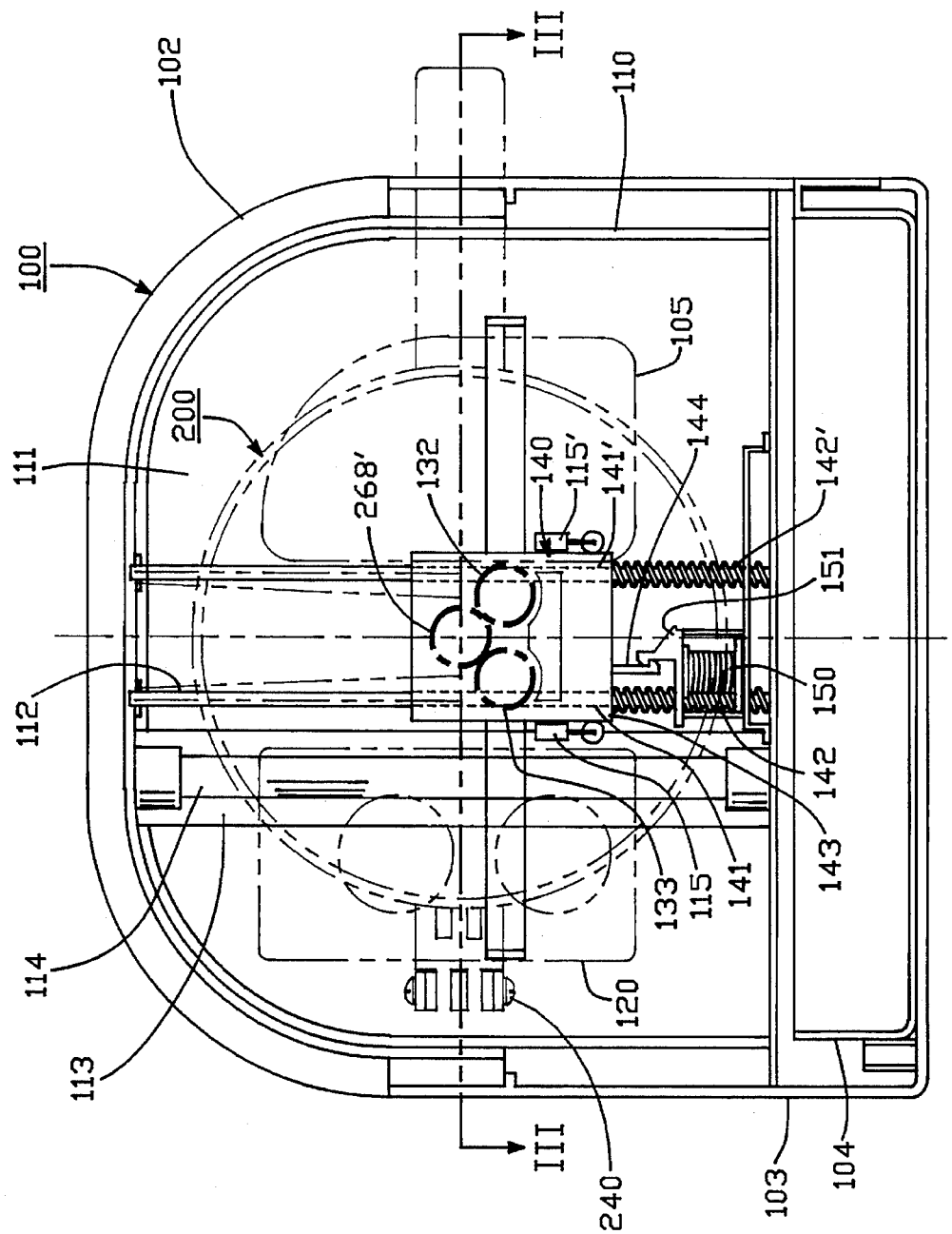
FIG. 2 is a vertical cross-sectional view of the barbecue according to the present invention.
Figure 3:
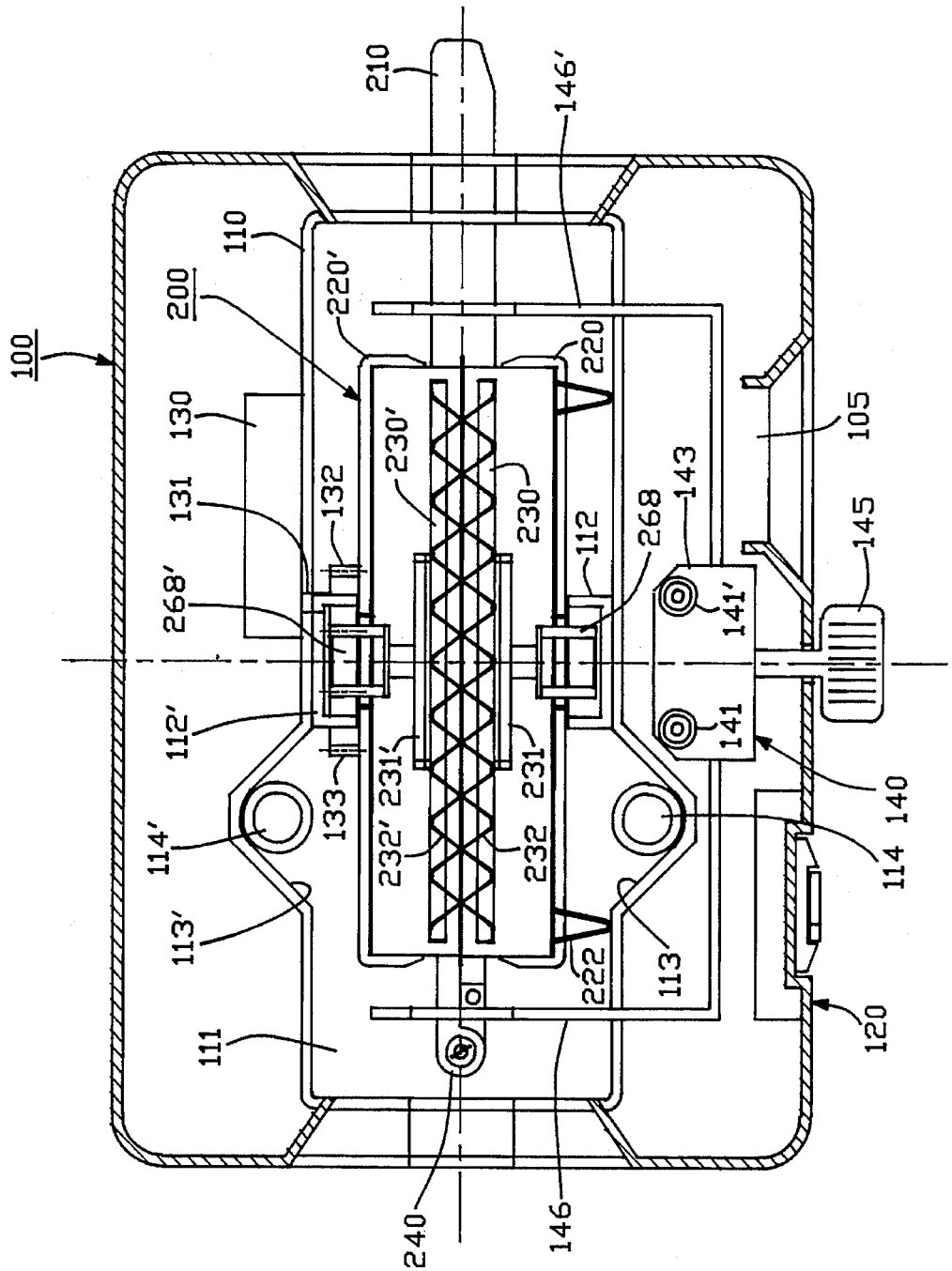
FIG. 3 is a partial cross-sectional view of the barbecue according to the present invention taken along line ILL—III of FIG. 2.

Referring to FIGS. 2 and 3, a drive motor 130 is mounted on a predetermined portion of the main frame 110, such as on an outer side wall thereof, and a shaft 131 of the drive motor 130 is extended through the main frame 110 to the inside of the cooking chamber 111. A drive gear 132 is provided on the motor shaft 131 to be driven by the drive motor 130. In addition, an idler gear 133 is mounted on a predetermined portion of one side wall of the cooking chamber 111 and spaced apart from the drive gear 132 by a predetermined distance.

A pair of guide channels 112 and 112' for guiding insertion and removal of the rotary grill 200 are provided on main frame 110 facing one another on the respective side walls of the cooking chamber 111. A pair of heating energy reflecting members 113 and 113' are provided at respective outwardly recessed (i.e., concave) portions formed in main frame 110 opposite one another within the cooking chamber 111 close to the guide channels 112 and 112'. Rod-shaped electrical radiant heating elements 114 and 114' may be detachably mounted within the reflecting members 113 and 113', end the ends of the heating elements 114, 114' 5 may be anchored to the main frame 110. The radiant heating elements 114 and 114' are preferably far-infrared ray type electric heaters, but coil type electric resistance elements or other suitable sources of cooking heat can also be used.

A lifting and lowering mechanism 140 is mounted on the main frame 110 outside of the cooking chamber 111 for lifting or lowering the rotary grill 200 within the cooking chamber 111. The lifting and lowering mechanism 140 includes a pair of parallel spaced guide rods 141 and 141' fixed vertically to the main frame 110. Coil compression, springs 142 and 142' are disposed over the lower portions of guide rods 141 and 141', respectively. A lifting and lowering member 143 is carried on the guide rods 141 and 141' so as to be vertically movable therealong above the springs 142 and 142'. A stopper 144, the function of which will be explained below, is provided on a lower portion of the lifting and lowering member 143, and the control knob 145 extended through the guide slit 106 is affixed to an outer portion of the lifting and lowering member 143 and travels within the limits of the guide slit 106 in the upper casing 102 for permitting the lifting and lowering member 143 to be moved vertically along the guide rods 141 and 141'.

in addition, the lifting and lowering member 143 is provided with a pair of outwardly extended arms 146 and 146' movable along with the lifting and lowering member 143 for supportingly lifting and lowering the rotary grill 200 in the cooking chamber 111. The outer ends of arms 146, 146' are extended inwardly to the inside of the cooking chamber 111, as through slots provided in main frame 100.

A solenoid 150 is mounted on a lower portion of the outer side wall of the main frame 110 below the lifting and lowering mechanism 140 and includes a catch member 151 for catching the stopper 144 of the member 143 during a lowering movement of the lifting and lowering member 143, for maintaining the lifting and lowering member 143 in its fully lowered state against the force of springs 142, 142'. At a suitable location on the main frame 110 there is provided one or a pair of electrical switches 115 and 115' for turning on/off the electric power supply to the radiant heating elements 114 and 114' and the drive motor 130. The switches 115 and 115' are arranged to be actuated as the lifting and lowering member 143 is lowered along the guide bars 141 and 141', and may preferably be lever type limit switches positioned so as to be actuated just before attaining the fully lowered position of lifting and lowering member 143 where the stopper 144 is caught by the catch member 151 of the solenoid 150 as the lifting and lowering member 143 is lowered.

The operation control panel 120 provided on the upper, casing 102 includes a lamp 121 for indicating the electric supply state when the power switches 115 and 115' become actuated by the lifting and lowering member 143 of the lifting and lowering mechanism 140, and a temporary stop switch for temporarily turning on/off the power supply so as to permit removal of the rotary grill 200 from the cooking chamber 111, for example so that the foods being cooked may be basted.

The operation control panel 120 further includes a timer 123 for setting an operation time of the radiant heating elements 114 and 114' and the drive motor 130, and a temperature controller 124 for controlling a heating amount level of the radiant heating elements 114 and 114'. Here, the timer 123 is preferably equipped with a suitable alarm device for issuing a noticeable alarm when a time period previously set therewith has elapsed.

At the bottom end of the guide channel 112' provided on main frame 110 on the side wall of the cooking chamber 111 opposite that side wall provided with the drive gear 132 and the idler gear 133, there is preferably formed a semicircular-shaped guide surface for rotatably supporting a drive gear of the rotary grill, or a pair of idler gears may be provided at positions corresponding to the drive gear 132 and the idler gear 133.

The rotation speed of the drive motor 130 is preferably within a range of 3~4 rpm, but the range is not limited therewithin. In addition, the temperature range of the temperature controller 124 may preferably have four control levels such as 80° C., 100° C., 150° C., and 200° C. The upper casing 102 is preferably capable of being disassembled from the lower casing 103 and the main frame 110 so as to facilitate cleaning the inside portion of the cooking chamber 111. The upper and lower casings 102, 103 and the main frame 110 may be formed of suitable materials acceptable for hygienic food service use and able to withstand the cooking temperatures and conditions to be encountered.

Figure 4:
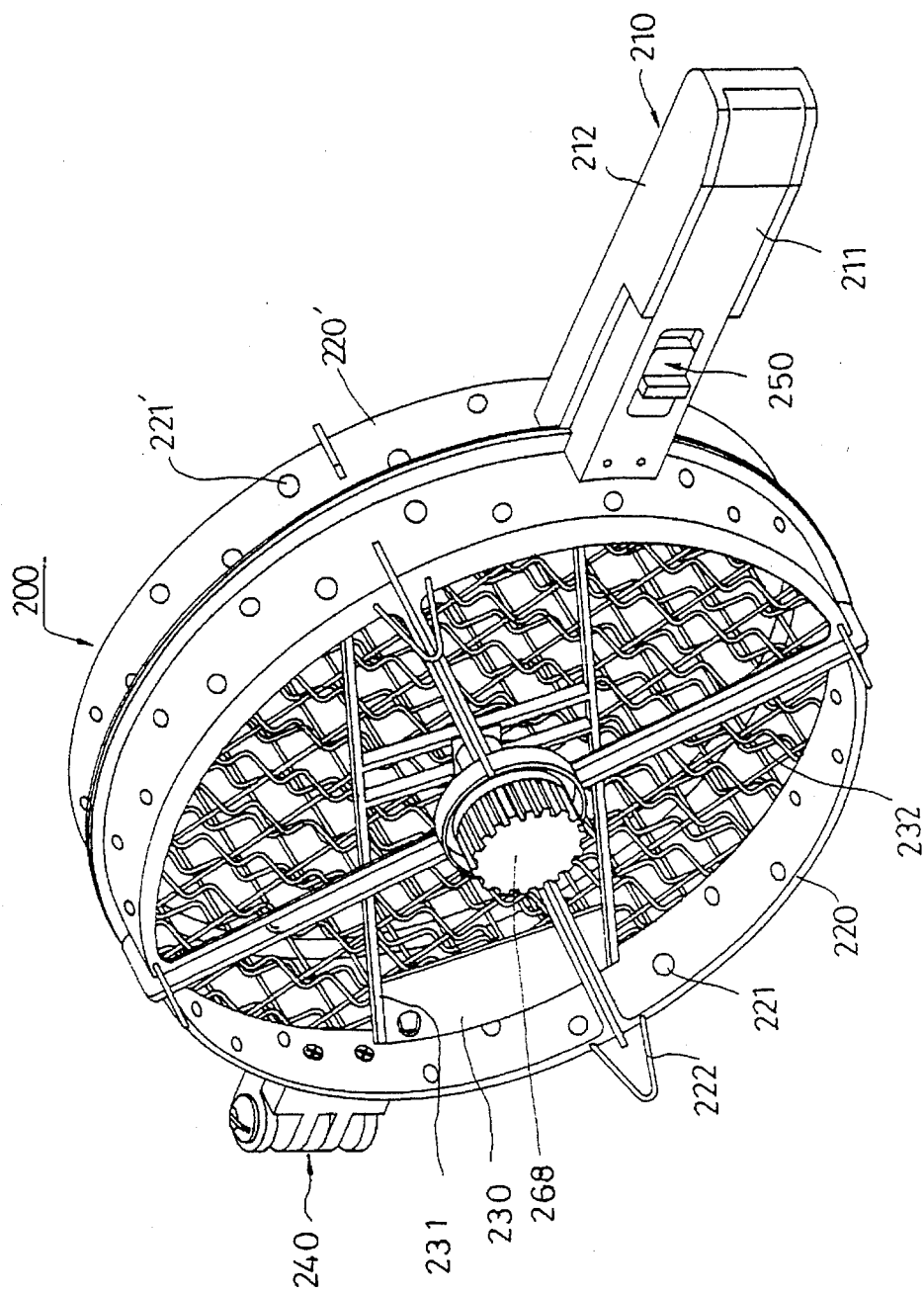
FIG. 4 is a perspective view of a rotary grill according to a first embodiment of the present invention.
Figure 5:
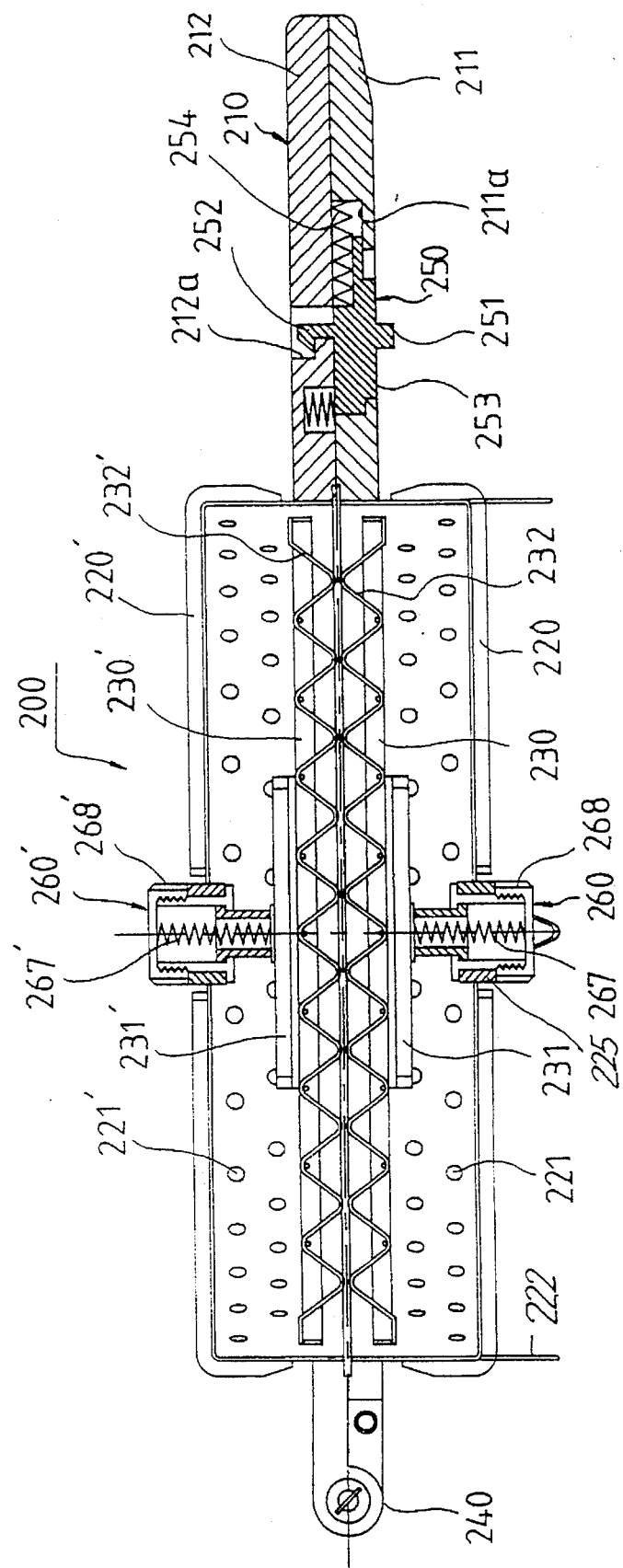
FIG. 5 is a top cross-sectional view of the rotary grill of the barbecue according to the present invention taken along line V—V in FIG. 4.

Referring now to FIGS. 4 and 5, the rotary grill 200 provided for being inserted into the cooking chamber 111 of the main body 100 includes a hinged pair of ring-like outer frames 220 and 220' and has an extended grip portion 210 formed by a pair of respective grip members 211 and 212. Circular fixing rims 230 and 230' are rotatably engaged to respective ones of the outer frames 220, 220', and extending across each fixing rim 230, 230' there is provided a respective wire mesh grillwork 232, 232'.

In the circumferential surface of each of the outer frames 220 and 220', there are provided a plurality of perforation holes 221 and 221' for guiding grease and food debris to drop therethrough to the reservoir 104 disposed below the cooking chamber 111, in addition, a plurality of outwardly extended support props 222, such as wire loops, of suitable length may be provided on an outer peripheral portion of one or both of the outer frames 220, 220' to enable the rotary grill 200 to be stood vertically upon a flat surface.

Figure 7:
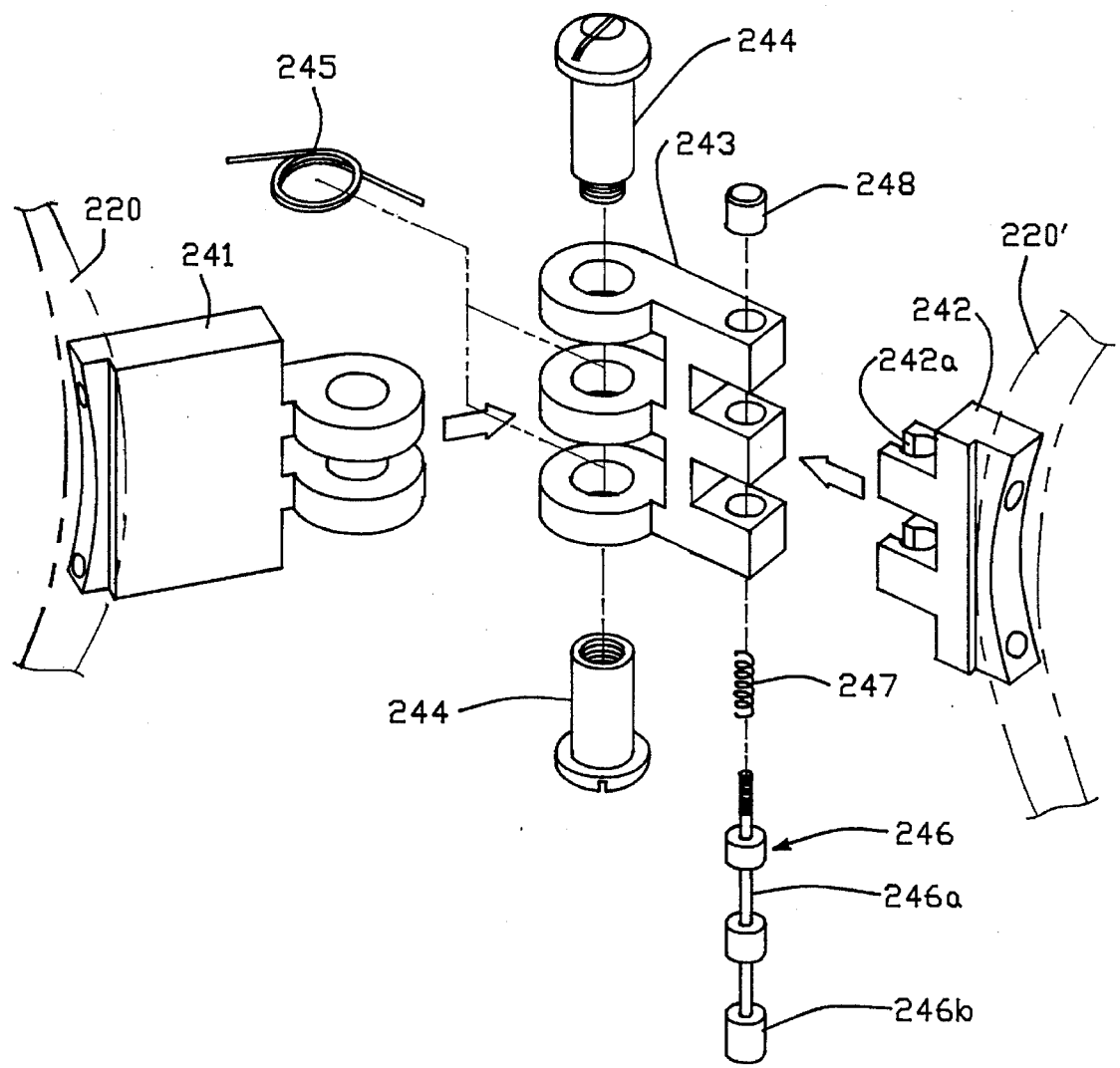
FIG. 7 is an exploded perspective detail view of a hinge portion of the rotary grill of FIG. 4.
Figure 8A:
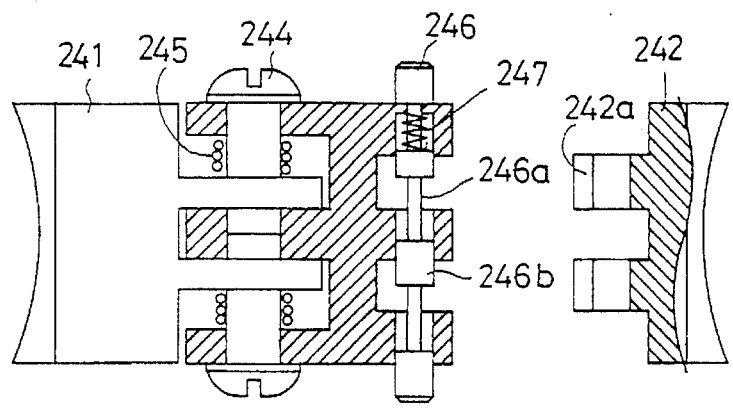
FIGS. 8A through 8C are cross-sectional views showing a procedure of assembling the hinge portion of FIG. 7.
Figure 8B:
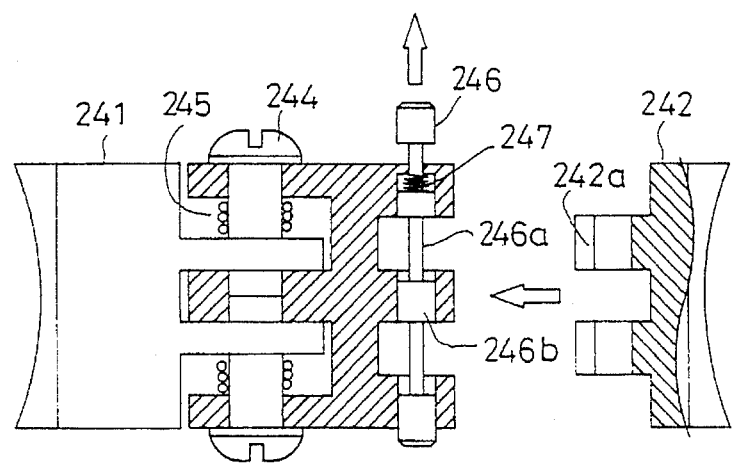
Figure 8C:
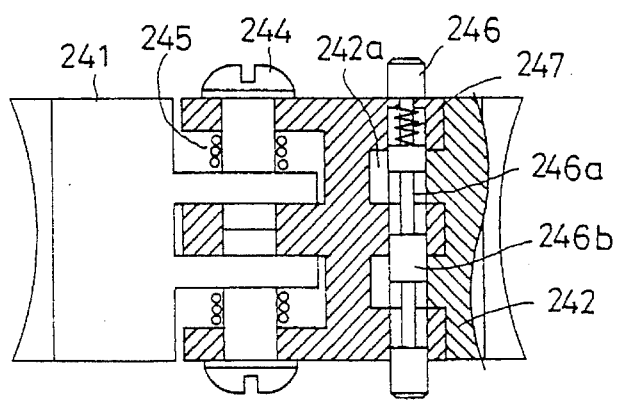

The outer frames 220 and 220' as shown in FIGS. 4 and 5 are foldable together and pivotally joined with one another by a hinge 240. As shown in more detail in FIG. 7, the hinge 240 includes hinge members 241 and 242 respectively affixed to the outer circumferential surfaces of the outer frames 220 and 220'. An intermediate hinge member 243 is provided for pivotably connecting the hinge members 241 and 242 together. A fixed hinge pin 244, for example formed by mating screw-threaded top and bottom half-pins, is insertable into the aligned pin holes of the mated hinge member 241 and intermediate hinge member 243 for pivotally connecting the hinge member 241 with one side of the intermediate hinge member 243. At least one torsion spring is 245 disposed around the hinge pin 244 between the hinge member 241 and intermediate hinge member 243 for providing a predetermined spreading torsion force to the hinge member 241 and the intermediate hinge member 243.

A movable hinge pin 246 pivotably and releasably connects the other side of intermediate hinge member 243 with the hinge member 242. The movable hinge pin 246 is slidably movable in aligned pin holes provided at the other side of the intermediate hinge member 243. A spring 247 is disposed over a small diameter end of movable hinge pin 246 passed through a reduced diameter of the top pin hole in intermediate hinge member 243 and threaded with an end cap 248. The spring 247 urges the movable hinge pin 246 downwardly in the intermediate hinge member 243 so that large diameter portions 246b are partly protruded into the gaps formed between the aligned pin holes in which gaps the fingers of hinge member 242 are fitted. Movable hinge pin 246 has small diameter portions 246a and large diameter portions 246b spaced therealong, and is linearly displaceable in intermediate hinge member 243 against force of the spring 247.

The hinge member 242 is provided with aligned pin holes opened to an outer edge of the hinge member 242 by a narrow opening 242a having a width greater than that of the small diameter portions 246a of the movable hinge pin 246 but smaller than that of the large diameter portions 246b of the movable hinge pin 246, so as to admit thereinto the small diameter portions 246a of the movable hinge pin 242 when aligned therewith. The operation of the hinge will be further described later.

Referring once more to FIGS. 4 and 5, the grip portion 210 includes a locking member 250 for locking the outer frames 220 and 220' of the rotary grill 200 together in folded relation by clamping together the grip members 211 and 212. An engaging groove 211a for receiving the locking member 250 slidably therein is formed in the grip member 211 which is affixed to the outer frame 220, and a hooking opening 212a is formed in the other grip member 212 affixed to the other outer frame 220'. The locking member 250 includes a protrusion 251 formed on an outside portion thereof whereby the locking member can be manipulated, and an engaging tip 252 formed on its inner side for slidably and catchingly engaging the hooking opening 212a of the grip member 212. The locking member 250 also is formed at its one end with a hooking member 253 slidably insertable into an end recess of the engaging groove 211a of the grip member 211 towards which the locking member 250 is urged by the force of a spring 254 disposed inside the other end of the engaging groove 211a and pressing on the other end of the locking member 250.

Alternatively to the above-described locking mechanism 250, other suitable types of locking mechanisms having a simpler structure, such as a ring mounted on one side grip member, may be used.

Figure 6:
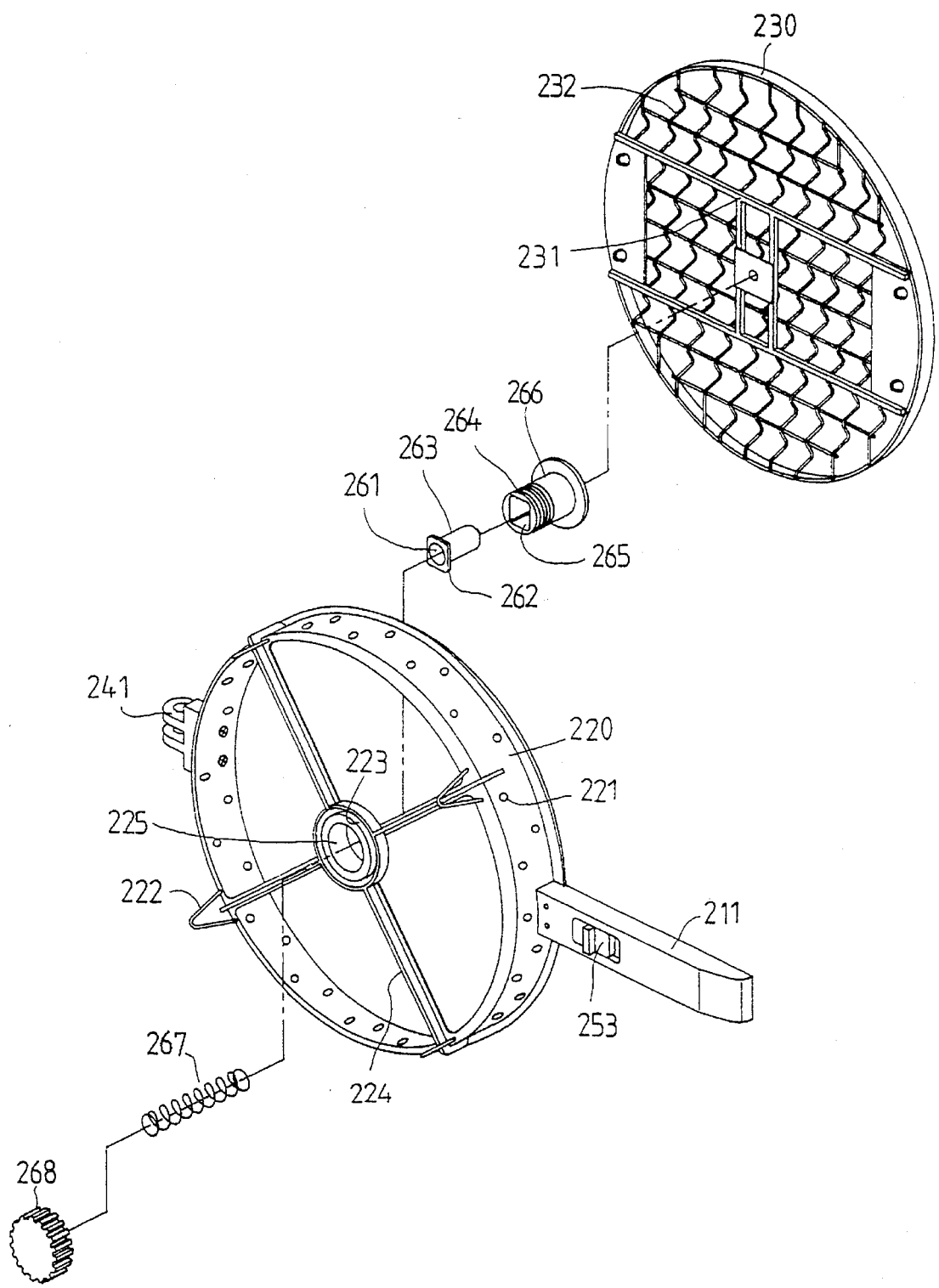
FIG. 6 is an exploded perspective view of a portion of the rotary grill of the barbecue according to the present invention.

It will be readily appreciated that the respective folding halves of the rotary grill 200 may advantageously be identical in their construction, i.e. mirror-images of one another, except for the previously described grip members and hinge members affixed thereto, and accordingly hereinafter the construction details of only one side of the rotary grill 200 will be described with reference to FIGS. 4 through 6.

The outer frame 220 includes a supporting multi-ribbed spider frame 224 extending across its outer side having a hub opening 223 provided at a central portion thereof. A bushing 225 is provided within the hub opening 223.

The fixing rim 230 has a slightly smaller diameter than the outer frame 220 so as to be freely and rotatably accommodated therewithin. A support frame 231 extends across the inside of fixing rim 230. The wire mesh grillwork 232 is affixed across the inner side of fixing rim 230, and for example may be detachably engaged to the support frame 231 of the fixing rim 230 using clips or the like (not shown) for facilitating its removal for washing.

At a central portion of the support frame 231 opposite grillwork 232 is provided a rotation member indicated generally at 260. The rotation member 260 includes a fixing shaft 263 affixed at an inner end thereof to the supporting frame 231 of the fixing rim 230 which fixing shaft 263 is provided with a square drive flange 262 at its outer end and has a central bore hole 261 formed therein. A cylindrical hollow movable member 266, the body of which is rotatably received through the bushing 225 provided in the hub 223, has a flanged inner end, an external thread 264 at an outer end thereof and a square receiving bore 265 far receiving the drive flange 262 of the fixing shaft 263 slidably therein, with the inner end of the square receiving bore 265 having a reduced diameter so as to permit the body of fixing shaft 263 to pass freely therethrough while stopping the drive flange 262 of fixing shaft 263, as may be seen in FIG. 5.

A coil spring 267 is inserted within the bore 261 of the fixing shaft 263 for providing an urging force to the movable member 266 against the fixing shaft 263 and in turn the fixing rim 230 and wire mesh grillwork 232. A cap type gear 268 is coupled to the thread 264 of the outer end of movable member 266 for closing the bore 265 and thereby capturing the outer end of spring 267 and fixing the rotation member 260 within the hub 223. Gear 268 is meshable with the drive gear 132 and idler gear 132 provided at the one side wall of the cooking chamber 111, and is also rotatable within the semicircular guide surface of the bottom of the guide channel 112 at the opposite side of the cooking chamber 111.

In the above-described embodiment in which the fixing rims 230 and 230' are engaged to the outer frames 220 and 220' by the rotation members 260,260', the foods to be cooked are placed between the wire mesh grillworks 232 and 232' and held stably therebetween by the pressing force of the coil springs 267, 267' when the outer frames 220 and 220' are folded together. It will be appreciated that foods of various sizes and thicknesses may thus be accommodated in rotary grill 200, and even when the rotary grill 200 is oriented vertically, the holding force of the springs 267, 267' exerted upon the fixing rims 231, 231' carrying the grillworks 232, 232' permits the foods to be held stably for cooking when the rotary grill 200 is inserted within the cooking chamber 111 and the fixing frames 231, 231' are rotated within the outer frames 230, 230' by the drive force of the drive motor 130 transmitted through the gear 268 or 268' under the state that the foods to be cooked are supported between the grillworks 232 and 232'.

Figure 9:
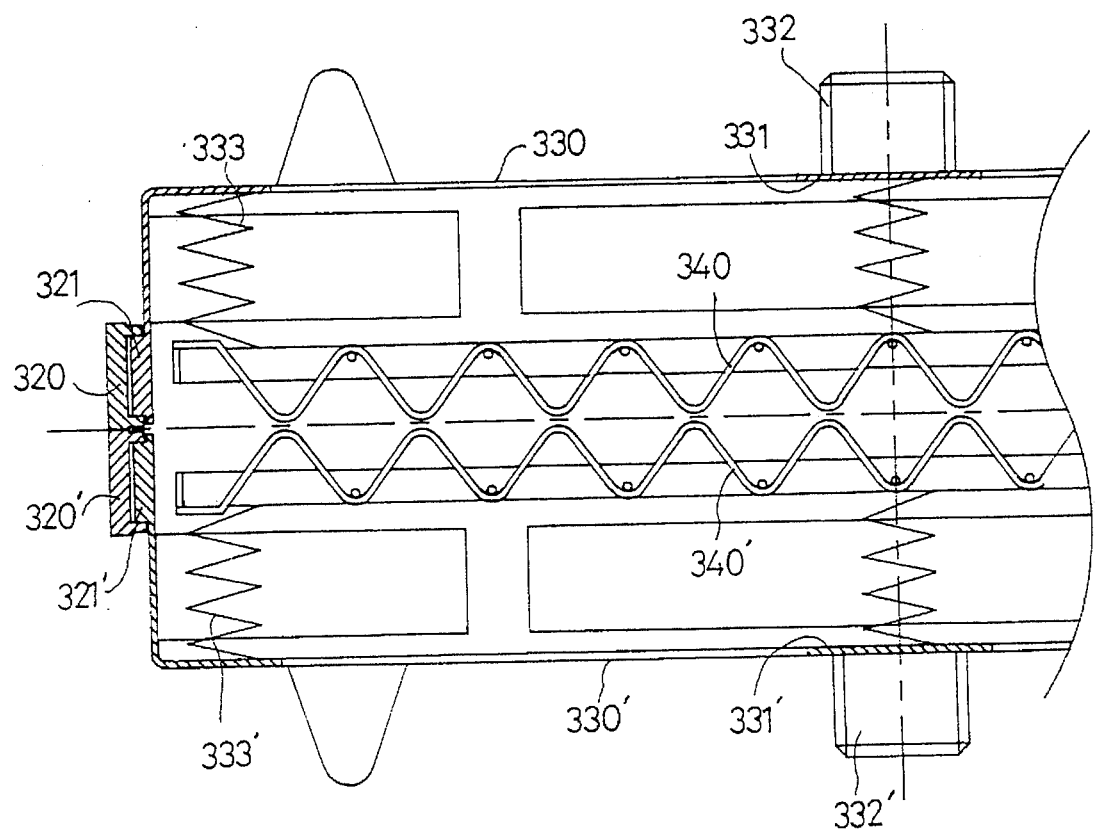
FIG. 9 is a cross-sectional view of a rotary grill according to a second embodiment of the present invention.

Referring to FIG. 9, there is shown a rotary grill construction according to another embodiment of the present invention. As shown in FIG. 9, guide grooves 321 and 321' are formed in the inner circumferential surfaces of outer frames 320 and 320', and the inner edges of respective fixing rims 330 and 330' are respectively carried rotatably therewithin. Wire mesh grillworks 340 and 340' are suspended within the fixing rims 330 and 330', respectively, by means of a plurality of coil compression springs 333 and 333' extending therebetween at intervals. Respective gears 332 and 332' meshable with drive gear 132 (FIG. 1) are fixed centrally to the supporting frames 331 and 331' of the fixing rims 330 and 330'.

It will be appreciated that in accordance with this alternative construction, irregularly shaped foods may be easily and stably accommodated within the rotary grill 200, as the urging force of the plural springs 333, 333' may be suitably distributed directly to the grillworks 340, 340' in different degrees according to the thickness of the foods therebetween, and the grillworks may diverge slightly relative one another within the fixing rims 330, 330', for example in case of cooking an irregularly shaped item of food differing substantially in thickness or girth along its length such as a chicken leg, for stably supporting the food.

The operation of the barbecue according to the present invention will now be explained.

When starting cooking of a desired food, the rotary grill 200 is substantially unfolded to permit the food to be cooked to be placed between the grillworks 232 and 232' and then the outer frames 230, 230' carrying the grillworks 232 and 232' are folded together by means of the hinge 240. Thereafter, the grip members 211 and 212 are fixed together by the locking device 250. At this time, the grillworks 232 and 232' are displaced outwardly against the coil springs 267 and 267' of the rotation members 260 and 260' by a displacement equivalent to the thickness of the food, so that the food to be cooked is stably held between the grillworks 232 and 232'.

Thereafter, the rotary grill 200 is inserted into the cooking chamber 111 through the opening 101 of the cooking unit 100, with the gears 268 and 268' of the rotary grill 200 being guided along the guide channels 112 and 112' formed on both the side walls of the cooking chamber 111. The rotary grill 200 is lowered until the rotary grill 200 comes into contact with the arms 146 and 146' of the lifting and lowering device 140 extended into the inside of the cooking chamber 111.

In this state, when the control knob 145 of the lifting and lowering device 140 is pushed downwardly, the lifting and lowering member 143 of the lifting and lowering mechanism 140 may be pushed downwardly until it eventually actuates the levers of the power switches 115 and 115' to cause the switches 115 and 115' to close, i.e., to turn on the switches 115, 115', while also pressing down the springs 142 and 142' as it is lowered along the guide bars 141 and 1 41' until its stopper 144 is caught by the catch member 151 of the solenoid 150. The rotary grill 200, being supported on the arms 146, 146' of the lifting and lowering member 143, will also descend therewith until the gears 268, 268' respectively mesh with the drive and idler gears 132, 133 and are supported upon the semicircular guide surface provided at the sides of the cooking chamber, whereafter the lifting and lowering member will continue to descend to the fully lowered position where switch actuation and catching of stopper 144 by solenoid catch 151 occur, at which point the arms 146 and 146' of the lifting and lowering device 140 are positioned separated from and below the rotary grill 200.

The one side gear 268 or 268' of the rotary grill 200 comes into meshing engagement with the gear 132 of the driving motor 130 mounted on the one side wall of the cooking chamber 111 and the idler gear 133, and the other side gear 268 or 268' thereof is supported in the semicircular guide groove of the guide channel 112.

In the state that the rotary grill 200 is completely inserted into the cooking chamber 111 of the main body 100, the user controls the timer 132 and the temperature controller 124 provided on the operation control panel 120 of the upper casing 102 to set the cooking time and the intensity of heat to be radiated from the heating elements 114 and 114' according to the kind of food to be cooked so that the heating elements 114 and 114' and the drive motor 130 become concurrently operated. The driving force from the driving motor 130 is transferred to the gear 268 or 268' of the rotary member 260, 260' of rotary grill 200 through the driving gear 132, whereby the fixing frames 230 and 230' of the rotary grill 200 to which the grillworks 232 and 232' are fixed are made to rotate, and then the food held between the grillworks 221 and 221' is exposed to and cooked by the heat radiated from the radiant heating elements 114 and 114'. It will be appreciated that the grip 210 and/or hinge 240 of the rotary grill 200 will, in this inserted position of the rotary grill 200, be supported in the slotted opening 110 in the cooking unit 100, so as to react rotational torque forces imparted to the outer frames 220, 220', thereby maintaining the outer frames 220, 220' stationary while the fixing frames 230, 230' are driven to rotate.

As the foods are cooked, grease or other debris which may issue from the foods is guided toward the reservoir 104 disposed at the bottom of the cooking chamber 111 through the perforation holes 221 and 221' formed in the outer frames 220 and 220', so that the grease and debris can be effectively eliminated from the foods and the cooking chamber without producing food smoke.

During cooking, the user may monitor the cooking of foods by viewing the foods through the viewing window 105.

Whenever it is desired to baste or apply sauce to the foods being cooked or otherwise to temporarily stop the cooking operation, the user pushes the temporary stop switch 122 mounted on the operation control panel 120, whereupon the electric power supply is cut off and then the catch member 151 of the solenoid 150 is released from the stopper 144 of the lifting and lowering member 143 of the lifting and lowering mechanism 140. Thereafter, the lifting and lowering member 143 is raised by the restoring force of the coil springs 142 and 142' until the arms 146 and 146' thereof once again come into supporting contact with the rotary grill 200, permitting the rotary grill 200 to be lifted up within the cooking chamber 111 by knob 145 of the lifting arid lowering mechanism or even to be removed from the cooking chamber 111 by grasping the grip 210, whereby convenient basting of the foods is made possible while cooking.

When the cooking time set by the timer 123 has elapsed, the timer 123 actuates the solenoid 150 electrically connected therewith to cause the catch member 151 of solenoid 150 to move laterally and thereby release the stopper 144 of the lifting and lowering member 143, whereupon the lifting and lowering member 143 is lifted along with its arms 146 and 146' by the restoring force of the coil springs 142 and 142'. As the lifting and lowering member 143 is lifted, the lifting and lowering member 143 releases the levers of the power switches 115 and 115' to cut off the power. Thereafter, the rotary grill 200 supported on the lifting and lowering mechanism 140 is projected upwardly toward the top of the cooking chamber 111 so that the user can recognize the cooking operation is completed. In addition, when the cooking operation has completed, an alarm issues from the timer 123 for indicating to the user the completion of the set cooking time period.

When the user desires to clean the barbecue after the cooking operation is completed, as shown in FIG. 7 and FIGS. 8A to 8C, the user pushes on the end of movable hinge pin 246 connecting the intermediate hinge member 243 and the one side of hinge member 242 so that the small diameter portions 246a of the movable hinge pin 246 becomes coincident with the openings 242a in the sides of the pin holes of the hinge member 212, whereupon the intermediate hinge member 243 may be separated from the hinge member 242. In case of separating the fixing rims 230 and 230' carrying the grillworks 232 and 232' from the outer frames 220 and 220', the gear 268 coupled to the drive member 266 of the rotation member 260 is released and then the clips fixing the grillworks 232 and 232' to the fixing rims 230 and 230' are also released therefrom thereby facilitating cleaning of the elements related thereto. The grease or debris collected in the reservoir 104 can be easily disposed of by removing the reservoir 104 from the lower casing 103.

As described above, the barbecue according to the present invention makes it possible to achieve the optimum cooking state of various types of foods by controlling the heating amount radiated to the food from the heating elements and the rotation speed of the rotary grill for thereby varying the cooking conditions so that a variety of foods can be cooked in accordance with their characteristics.

Because foods such as meats and other foods having highs level of fat and oils are cooked near the radiant heating elements while rotating, the fat contained in the foods can be removed therefrom, so that cooked foods with lower fat can be obtained. Furthermore, the user can conveniently baste the food being cooked whenever desired by removing the rotary grill from the heating chamber.

Moreover, by providing a vertical cooking chamber and disposing the grill vertically therewithin, the barbecue according to the present invention may advantageously be constructed to have a light weight and small volume making it easy to handle, and its employment of easily disassemblable elements facilitates handling and cleaning.

The invention claimed is:

1. A barbecue comprising:

a cooking unit opened at least a top end thereof and having a vertical cooking chamber therewithin;

heating means disposed to each side of the cooking chamber for radiating cooking heat thereinto;

rotary grill means for holding food and insertable through the top end of the cooking unit so as to be disposed vertically within the cooking chamber between the heating means; and driving means for rotating the rotary grill means about a horizontal axis within the cooking chamber.

2. The barbecue of claim 1, wherein said cooking unit includes:

an outer casing having an opening at least a top end thereof; and a main frame enclosed by said outer casing and having side walls defining therewithin said vertical cooking chamber.

3. The barbecue of claim 1, wherein said driving means includes a driving motor mounted on a side surface of the cooking chamber.

4. The barbecue of claim 1, wherein said driving motor includes a driving gear for rotatingly driving the rotary grill means.

5. The barbecue of claim 1, further comprising a vertically movable lifting and lowering means provided in the cooking unit for raising and lowering the rotary grill means within the cooking chamber.

6. The barbecue of claim 5, wherein a solenoid is provided in the cooking unit which solenoid includes a stopper for releasably holding the lifting and lowering means at a lowered position thereof.

7. The barbecue of claim 5, wherein the lifting and lowering means includes a pair of guide rods fixed to a main frame of the cooking unit, a lifting and lowering member movable upwardly and downwardly along the guide rods and having a hooking member for being engaged by the stopper of the solenoid, spring means for urging the lifting and lowering member upwardly, an operation knob extended to the outside of the cooking unit and arms extended from the lifting and lowering member to the inside of the cooking chamber for supporting the rotary grill means thereon.

8. The barbecue of claim 7, wherein the cooking unit includes electrical switch means operable by the vertical displacement of the lifting and lowering member for controlling the supply of electrical power to the heating means and driving means.

9. The barbecue of claim 2, wherein said outer casing includes a window for viewing a cooking state of food therethrough.

10. The barbecue of claim 2, wherein said outer casing includes an operation control panel having control means for controlling a cooking operation of the barbecue.

11. The barbecue of claim 10, wherein said operation control panel includes a lamp for visually indicating a operational state of the barbecue.

12. The barbecue of claim 10, wherein said operation control panel includes a timer for setting an operation time of the heating means and driving means.

13. The barbecue of claim 10, wherein said operation control panel includes a temperature controller for controlling a heating amount of the heating means.

14. The barbecue of claim 10, wherein said operation control panel includes a stop switch for temporarily stopping an operation of the barbecue.

15. The barbecue of claim 2, wherein said outer casing includes at a lower portion thereof a removable reservoir disposed below the cooking chamber.

16. The barbecue of claim 1, wherein said cooking chamber includes at both side surfaces thereof guide means for guiding an insertion of the rotary grill means thereinto.

17. The barbecue of claim 4, wherein said cooking chamber includes at one side surface thereof an idler gear spaced apart from the driving gear of the driving means.

18. The barbecue of claim 17, wherein said cooking chamber includes at another side surface thereof a pair of idler gears cooperative with the idler gear and driving gear.

19. The barbecue of claim 1, wherein said cooking chamber includes at both sides thereof reflector means for reflecting heat radiated from the heating means.

20. The barbecue of claim 1, wherein said heating means is a far-infrared ray heater.

21. The barbecue of claim 1, wherein said rotary grill means includes:

a pair of outer frames;

hinge means affixed to the outer frames for enabling said outer frames to be folded together;

a rim rotatably carried within each outer frame and having a gear for being driven by the driving means;

a grillwork carried on an inner side of each rim for supporting food thereon; and means for urging the grillworks of the respective rims inwardly toward one another when the outer frames are folded together.

22. The barbecue of claim 21, wherein at least one of said outer frames is provided with outwardly extended support means for supporting said rotary grill means to stand vertically.

23. The barbecue of claim 21, wherein each of said outer frames is pierced by a plurality of perforation holes.

24. The barbecue of claim 21, wherein said hinge means includes:

first and second hinge members fixed to respective ones of the outer frames of the rotary grill means;

an intermediate hinge member for pivotably connecting said first and second hinge members;

a fixed hinge pin for pivotably connecting the first hinge member and the intermediate hinge member;

a torsion spring disposed around said fixed hinge pin for urging the first hinge member and the intermediate hinge member apart; and a movable hinge pin for releasably and pivotably connecting the intermediate hinge member and the second hinge member.

25. The barbecue of claim 24, wherein said movable hinge pin is carried in the intermediate hinge member and linearly movable therein and is formed at an outer circumferential portion thereof with large diameter portions and small diameter portions, alternatively spaced therealong, which small diameter portions are insertable into pin holes provided in the second hinge member.

26. The barbecue of claim 25, wherein said second hinge member has pin holes opened at an outer edge thereof by an opening having a width greater than that of the small diameter portions of the movable hinge pin and smaller than that of the large diameter portions of the movable hinge pin.

27. The barbecue of claim 21, wherein each of said rims includes a support frame having said drive gear mounted at a center thereof and is rotatably coupled to a guide groove formed in an inner circumferential surface of the outer frame and wherein each grillwork is carried by said rim by means of a plurality of coil springs provided therebetween.

28. The barbecue of claim 21, wherein each rim is carried by its respective outer frame by rotating means.

29. The barbecue of claim 28, wherein said rotating means includes:

a fixing shaft fixed to the support frame of the rim and provided with a bore therein and a drive flange at an outer end thereof;

a cylindrical hollow movable member having a threaded portion at an outer end surface thereof and a receiving bore for slidably receiving the fixing shaft therein and rotatably carried by the outer frame;

a coil spring provided in the bore of the fixing shaft and the receiving bore of the movable member; and a drive gear coupled to the threaded portion of the cylindrical hollow movable member.

30. The barbecue of claim 29, wherein said outer frame includes a frame provided at a center thereof with a hub for rotatably carrying the movable member of the rotating means.

31. The barbecue of claim 30, wherein said hub includes a bushing for receiving therein the movable member of the rotating means.

32. The barbecue of claim 21, wherein said rotary grill means includes grip means.

33. The barbecue of claim 32, wherein said grip means includes first and second grip members affixed to respective ones of the outer frames and locking means for locking said first and second grip members together for maintaining a folded state of the outer frames of the rotary grill means.

34. The barbecue of claim 33, wherein said locking means is a ring fixed to one of grip members.

35. The barbecue of claim 33, wherein said locking means includes a hooking opening formed in the first grip member, a hooking member slidably inserted in a hole formed in the second side grip member and having a protrusion on one side and a hooking means on the other side for hooking to the hooking opening, and a spring means for urging the hooking member towards the hooking opening.

* * * * *